US007697250B2

(12) United States Patent

Davison et al.

(10) Patent No.: US 7,697,250 B2

(45) Date of Patent: Apr. 13, 2010

(54) SWITCH-TO-TRIP POINT TRANSLATION

(76) Inventors: William Davison, 2451 5$^{th}$ Ave. SE., Cedar Rapids, IA (US) 52403; David Joseph Dunne, 3807 Terrace Hill Dr. NE., Cedar Rapids, IA (US) 52402; Steve M. Meehleder, 505 Huntington Ridge Rd., Cedar Rapids, IA (US) 52402; Kevin John Malo, 835 Oakcrest, Iowa City, IA (US) 52246

( * ) Notice: Subject to any disclaimer, the term of this patent is extended or adjusted under 35 U.S.C. 154(b) by 471 days.

(21) Appl. No.: 11/824,693

(22) Filed: Jul. 2, 2007

(65) Prior Publication Data

US 2008/0012670 A1 Jan. 17, 2008

Related U.S. Application Data

(60) Provisional application No. 60/831,006, filed on Jul. 14, 2006.

(51) Int. Cl.
*H02H 9/08* (2006.01)

(52) U.S. Cl. ........................................ 361/93.3; 361/42

(58) Field of Classification Search ................... 361/42, 361/93.2, 93.3; 335/176
See application file for complete search history.

(56) References Cited

U.S. PATENT DOCUMENTS

| | | | | |
|---|---|---|---|---|
| 4,301,435 | A | 11/1981 | Castonguay et al. | 335/26 |
| 4,679,019 | A | 7/1987 | Todaro et al. | 335/172 |
| 4,951,052 | A | 8/1990 | Jacob et al. | 341/122 |
| 4,992,723 | A | 2/1991 | Zylstra et al. | 323/284 |
| 5,014,025 | A | 5/1991 | Papallo, Jr. et al. | 335/167 |
| 5,124,875 | A | 6/1992 | Ishii et al. | 361/93 |
| 5,220,479 | A * | 6/1993 | Fraisse | 361/97 |
| 5,276,416 | A | 1/1994 | Ozaki | 335/18 |
| 5,343,179 | A | 8/1994 | Pipich et al. | 335/167 |

(Continued)

FOREIGN PATENT DOCUMENTS

EP 0 303 994 A 2/1989

(Continued)

OTHER PUBLICATIONS

Written Opinion corresponding to co-pending International Patent Application Serial No. PCT/US2007/015914, European Patent Office, dated Mar. 14, 2008, 8 pages.
International Search Report corresponding to co-pending International Patent Application Serial No. PCT/US2007/015914, European Patent Office, dated Mar. 14, 2008, 8 pages.

*Primary Examiner*—Danny Nguyen

(57) ABSTRACT

A translation technique for translating mechanical button positions of a circuit breaker to trip point settings stored in a memory of the circuit breaker. A turn of a mechanical button turns a potentiometer button, whose output is converted to scaled voltages and converted to corresponding digital values. These digital values are checked against a range of thresholds (minimum/maximum) corresponding to mechanical orientation positions of the mechanical button. Once the mechanical orientation position is determined by scaling and converting the potentiometer output, a trip curve lookup table stored in memory is accessed to determine which trip point setting should be set for the circuit breaker based upon the button position. The circuit breaker's trip curve settings can be changed easily via the mechanical button. They can also be changed easily by modifying the trip curve lookup table without having to recalibrate the circuit breaker or the switch settings.

20 Claims, 11 Drawing Sheets

U.S. PATENT DOCUMENTS

| | | | | |
|---|---|---|---|---|
| 5,510,773 | A | 4/1996 | Rodgers | 340/638 |
| 5,646,586 | A | 7/1997 | Castonguay et al. | 335/132 |
| 5,666,256 | A | 9/1997 | Zavis et al. | 361/115 |
| 5,670,923 | A | 9/1997 | Gonzalez et al. | 335/177 |
| 5,701,111 | A | 12/1997 | Castonguay et al. | 335/177 |
| 5,710,399 | A | 1/1998 | Castonguay et al. | 200/17 R |
| 6,009,615 | A | 1/2000 | McKean et al. | 29/602.1 |
| 6,031,195 | A | 2/2000 | Meili et al. | 200/318 |
| 6,061,217 | A | 5/2000 | Grunert et al. | 361/42 |
| 6,084,756 | A | 7/2000 | Doring et al. | 361/45 |
| 6,154,115 | A | 11/2000 | Flohr | 337/13 |
| 6,330,142 | B1 * | 12/2001 | Bellotto et al. | 361/93.3 |
| 6,351,232 | B1 | 2/2002 | Marie | 341/155 |
| 7,162,653 | B2 * | 1/2007 | Mares et al. | 713/310 |
| 7,307,504 | B1 | 12/2007 | Carlino et al. | 336/213 |
| 2002/0145416 | A1 | 10/2002 | Attarian et al. | 324/127 |

FOREIGN PATENT DOCUMENTS

| | | | |
|---|---|---|---|
| EP | 0 477 936 | A | 4/1992 |
| EP | 0 580 473 | A | 1/1994 |
| GB | 397 635 | A | 8/1933 |
| GB | 1 293 134 | A | 10/1972 |
| GB | 2 360 135 | A | 9/2001 |
| WO | WO 2006/087342 | A1 | 8/2006 |

* cited by examiner

SWITCH-TO-TRIP POINT TRANSLATION

RELATED APPLICATION

The present application claims the benefit of U.S. Provisional Application No. 60/831,006, filed Jul. 14, 2006, titled "Motor Circuit Protector," and hereby incorporates that application by reference in its entirety.

FIELD OF THE INVENTION

This invention is directed generally to a user adjustment switch for use in an electrical apparatus, and, more particularly, to a mechanical adjustment switch coupled with a potentiometer for detecting electrical failure modes in trip units.

BACKGROUND OF THE INVENTION

As is well known, a circuit breaker is an automatically operated electro-mechanical device designed to protect a conductor from damage caused by a power overload or a short circuit. Circuit breakers may also be utilized to protect loads. A circuit breaker may be tripped by an overload or short circuit causing an interruption of power to the load. A circuit breaker can be reset (either manually or automatically) to resume power flow to the loads. One type of circuit breaker that provides instantaneous short circuit protection to motoros and/or motor control centers ("MCC") is called a motor circuit protector (MCP). A typical MCP includes a temperature-triggered overload relay, a circuit breaker, and a contactor. An MCP circuit breaker must meet National Electric Code ("NEC") requirements when installed as part of a UL-listed MCC to provide instantaneous overload protection.

Mechanical circuit breakers energize an electro-magnetic device such as a solenoid to trip a breaker instantaneously due to large surges in current such as by a short circuit. The solenoid is tripped when current exceeds a certain threshold. MCPs must protect against fault currents while avoiding tripping on in-rush motor currents or locked-rotor currents, but these current levels vary by motor. Existing MCPs have a relatively limited operating range, so they are suitable for protecting motor circuits within the MCP's operating range. For motor circuits outside of a particular MCP's operating range, a different MCP must be designed for the operating parameters of those motor circuits.

It is costly to design a different MCP device for different current ratings, and it is also costly to inventory and distribute many different MCP devices. What is needed is an MCP device with user-adjustable and automatically configurable trip point settings over a broad range of current ratings. What is also needed is a circuit protection device that couples a mechanical button and a potentiometer for adjusting trip levels of an electrical circuit.

SUMMARY OF THE INVENTION

Aspects of the present invention improves conventional techniques of translating user-adjustable trip unit settings to pickup levels. These aspects enable a fail-safe operation mode where user adjustments can revert to greater or any other predetermined protective levels. Overall system performance is improved with lower-cost components without requiring switch calibration. Switch performance is verified during the production test process with quantitative techniques.

The MCP according to aspects of the present invention includes a user adjustment assembly for adjusting the tripping levels of the MCP. The user adjustment assembly includes a mechanical button with switch-like stop and detent features corresponding to mechanical orientation angles that are translated to a potentiometer mechanical orientation via a user adjustment circuit. There is a continuity or lack of discontinuity between switch position ranges. The user adjustment circuit may include a potentiometer and is configured to present a percentage of an A/D's full-scale voltage to an A/D input pin, which converts the scaled voltage to a corresponding digital value that determines the button position.

The user adjustment circuit is a cheaper alternative to existing mechanical solutions by substantially eliminating the number of mechanical parts required to translate mechanical switch positions to meaningful data.

Software embedded in the MCP and executed by a controller in the MCP implements a switch detection algorithm that includes a failure mode detection. Mechanical button positions are determined via the controller's A/D converter, and changes to the mechanical button positions are sensed by the A/D converter and the MCP's trip levels are automatically adjusted based upon the new position. The failure mode detection reverts to predetermined protective levels.

The user adjustment assembly according to aspects of the present invention eliminates the need for calibration. Position thresholds are determined by producing a statistical distribution of data corresponding to the switch settings, and as each user adjustment assembly is produced, the position thresholds and user adjustment assembly performance are monitored and stored.

Aspects of various embodiments described herein provide for methods for translating trip unit switch positions to trip point settings for embedded software-controlled trip unit systems. These aspects offer an improvement over a simple lookup table search for accessing stored calibrated trip data. The algorithms that implement these aspects can be extended to any trip unit system that requires access to calibrated trip pickup data. Specifically, the switch-to-trip point translation algorithms involve data compression of trip point data, diagnostic checksums, switch-to-trip point memory mapping, and the extension of data settings to elevated temperatures. This solution allows trip unit devices to be updated easily and securely, independent of embedded software product design. Normalized templates including normalized trip point data are used as a starting point for calibrating the embedded software. Trip point changes relative to switch settings can be made without changing product code as long as data points are within a maximum-minimum range.

In an implementation of the present invention, a method is provided for translating mechanical positions to trip curves of an electrical tripping system. The method includes operatively coupling a mechanical button to a potentiometer of an electrical tripping system, the electrical tripping system being operable to trip at an operating trip curve. In response to adjusting the mechanical button to a first position, a first signal indicative of a trip curve of a plurality of trip curves is received from the potentiometer. The first signal is associated with one of the plurality of trip curves to produce a first trip curve. An operating trip curve is set to be the first trip curve.

In an alternative implementation of the present invention, a method is provided for adjusting a circuit breaker operating trip curve in response to selecting a mechanical position. The method includes providing a mechanical button for selecting any of a plurality of mechanical positions. A potentiometer is mounted to a printed wire assembly of a circuit breaker, the potentiometer having a plurality of potentiometer positions indicative of respective ones of a plurality of trip curves. Each of the plurality of mechanical positions is operatively coupled to a corresponding one of the plurality of potentiometer positions. In response to selecting a first position of the plurality of mechanical positions, a potentiometer first signal is sent. The potentiometer first signal is indicative of a first curve of the plurality of trip curves. An operative trip curve of the circuit breaker is set to be the first curve. In response to selecting a second position of the plurality of mechanical positions, a potentiometer second signal is sent. The potentiometer second signal is indicative of a second curve of the plurality of trip curves. The operative trip curve is changed to be the second trip curve.

In another alternative implementation of the present invention, an electrical tripping system is operable at an operating trip curve and includes a mechanical button, a potentiometer, and a controller. The mechanical button has a plurality of mechanical positions. The potentiometer is operatively coupled to the mechanical button and produces a first data signal in response to selection of a first position of the plurality of mechanical positions. The controller is communicatively coupled to the potentiometer and is programmed to associate the first data signal with one of a plurality of trip curves to produce a first trip curve and to set the operating trip curve to be the first trip curve.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
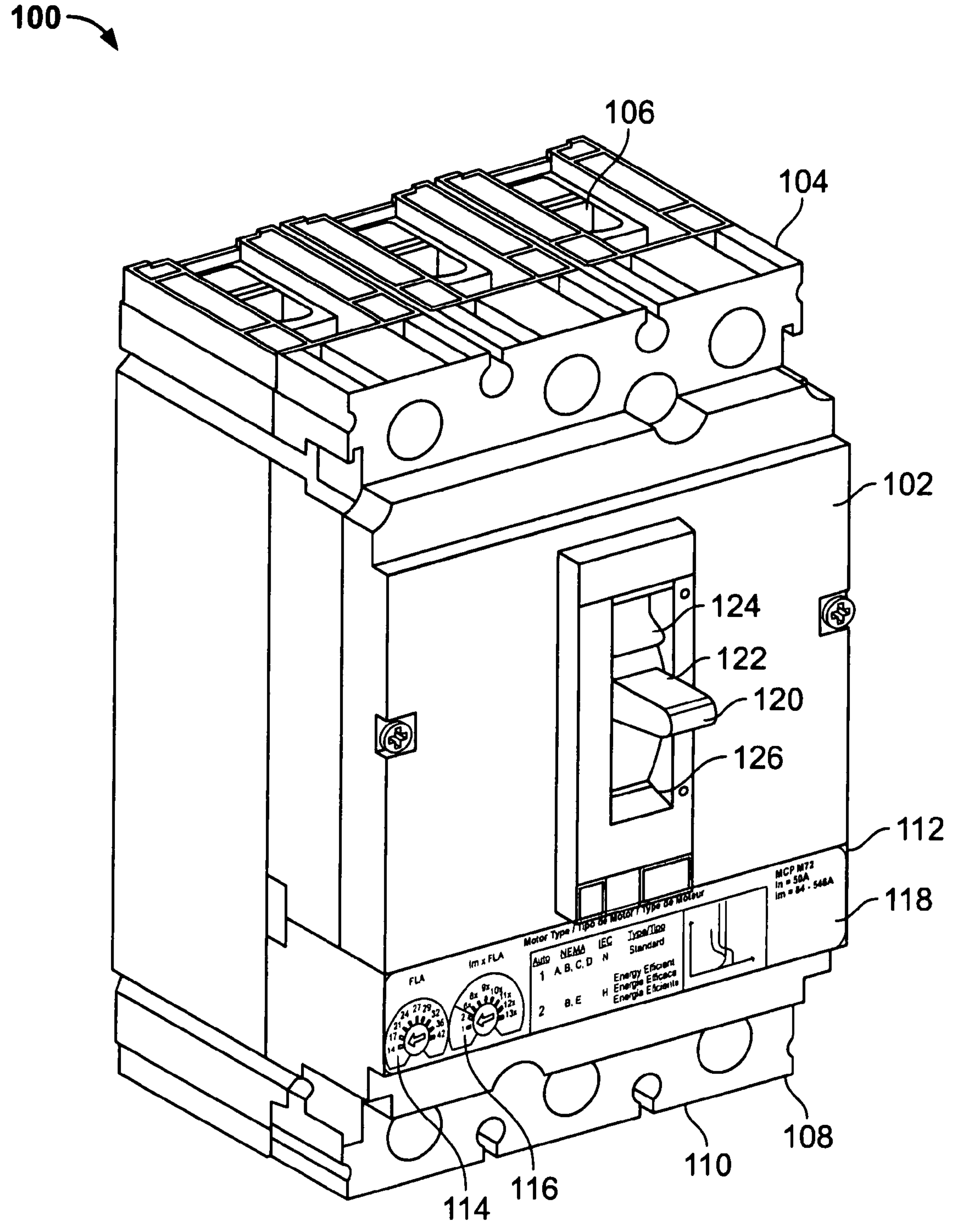
FIG. 1 is perspective view of a motor circuit protector according to the present application.

Turning now to FIG. 1, an electronic motor circuit protector 100 is shown. The motor circuit protector 100 includes a durable housing 102 including a line end 104 having line terminals 106 and a load end 108 having load lugs or terminals 110. The line terminals 106 allow the motor circuit protector 100 to be coupled to a power source and the load terminals 110 allow the motor circuit protector 100 to be coupled to an electrical load such as a motor as part of a motor control center ("MCC"). In this example the motor circuit protector 100 includes a three-phase circuit breaker with three poles, although the concepts described below may be used with circuit protectors with different numbers of poles, including a single pole.

The motor circuit protector 100 includes a control panel 112 with a full load ampere ("FLA") dial 114 and an instantaneous trip point ("$I_m$") dial 116 which allows the user to configure the motor circuit protector 100 for a particular type of motor to be protected within the rated current range of the motor circuit protector 100. The full load ampere dial 114 allows a user to adjust the full load which may be protected by the motor circuit protector 100. The instantaneous trip point dial 116 has settings for automatic protection (three levels in this example) and for traditional motor protection of a trip point from 8 to 13 times the selected full load amperes on the full load ampere dial 114. The dials 114 and 116 are located next to an instruction graphic 118 giving guidance to a user on the proper settings for the dials 114 and 116. In this example, the instruction graphic 118 relates to NEC recommended settings for the dials 114 and 116 for a range of standard motors. The motor circuit protector 100 includes a breaker handle 120 that is moveable between a TRIPPED position 122 (shown in FIG. 1), an ON position 124 and an OFF position 126. The position of the breaker handle 120 indicates the status of the motor circuit protector 100. For example, in order for the motor circuit protector 100 to allow power to flow to the load, the breaker handle 120 must be in the ON position 124 allowing power to flow through the motor circuit protector 100. If the circuit breaker is tripped, the breaker handle 120 is moved to the TRIPPED position 122 by a disconnect mechanism, causing an interruption of power and disconnection of downstream equipment. In order to activate the motor circuit protector 100 to provide power to downstream equipment or to reset the motor circuit protector 100 after tripping the trip mechanism, the breaker handle 120 must be moved manually from the TRIPPED position 120 to the OFF position 126 and then to the ON position 124.

Figure 2:
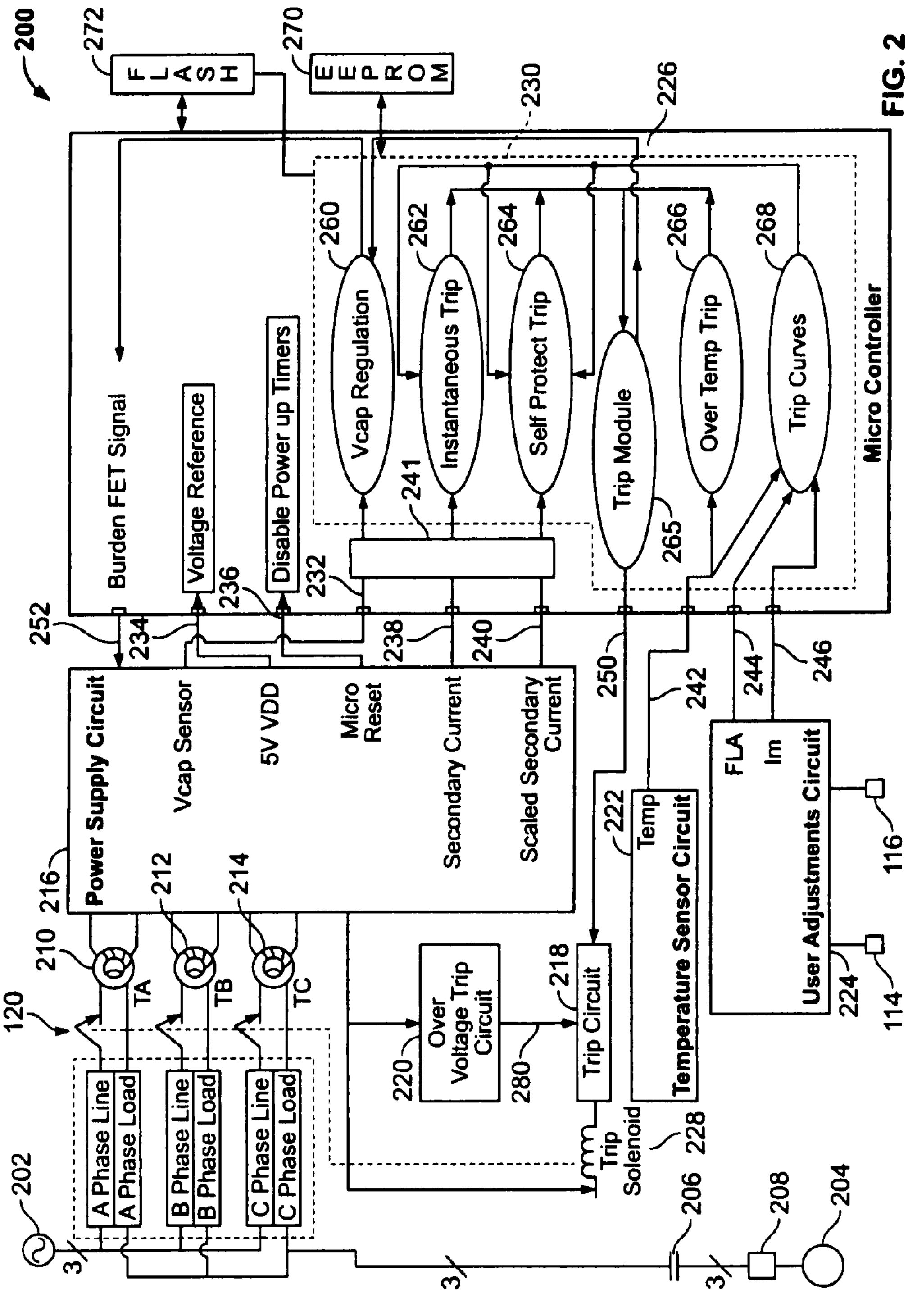
FIG. 2 is a functional block diagram of the motor circuit protector in FIG. 1.

FIG. 2 is a functional block diagram of the motor circuit protector 100 in FIG. 1 as part of a typical MCC configuration 200 coupled between a power source 202 and an electrical load such as a motor 204. The MCC configuration 200 also includes a contactor 206 and an overload relay 208 downstream from the power source 202. Other components such as a variable speed drive, start/stop switches, fuses, indicators and control equipment may reside either inside the MCC configuration 200 or outside the MCC configuration 200 between the power source 202 and the motor 204. The motor circuit protector 100 protects the motor 204 from a short circuit condition by actuating the trip mechanism, which causes the breaker handle 120 to move to the TRIPPED position when instantaneous short-circuit conditions are detected. The power source 202 in this example is connected to the three line terminals 106, which are respectively coupled to the primary windings of three current transformers 210, 212 and 214. Each of the current transformers 210, 212 and 214 has a phase line input and a phase load output on the primary winding. The current transformers 210, 212 and 214 correspond to phases A, B and C from the power source 202. The current transformers 210, 212 and 214 in this example are iron-core transformers and function to sense a wide range of currents. The motor circuit protector 100 provides instantaneous short-circuit protection for the motor 204.

The motor circuit protector 100 includes a power supply circuit 216, a trip circuit 218, an over-voltage trip circuit 220, a temperature sensor circuit 222, a user adjustments circuit 224, and a microcontroller 226. In this example, the microcontroller 226 is a PIC16F684-E/ST programmable microcontroller, available from Microchip Technology, Inc. based in Chandler, Ariz., although any suitable programmable controller, microprocessor, processor, etc. may be used. The microcontroller 226 includes current measurement circuitry 241 that includes a comparator and an analog-to-digital converter. The trip circuit 218 sends a trip signal to an electromechanical trip solenoid 228, which actuates a trip mechanism, causing the breaker handle 120 in FIG. 1 to move from the ON position 124 to the TRIPPED position 122, thereby interrupting power flow to the motor 204. In this example, the electro-mechanical trip solenoid 228 is a magnetic latching solenoid that is actuated by either stored energy from a discharging capacitor in the power supply circuit 216 or directly from secondary current from the current transformers 210, 212 and 214.

The signals from the three current transformers 210, 212 and 214 are rectified by a conventional three-phase rectifier circuit (not shown in FIG. 2), which produces a peak secondary current with a nominally sinusoidal input. The peak secondary current either fault powers the circuits 216, 218, 220, 222, and 224 and the microcontroller 226, or is monitored to sense peak fault currents. The default operational mode for current sensing is interlocked with fault powering as will be explained below. A control algorithm 230 is responsible for, inter alia, charging or measuring the data via analog signals representing the stored energy voltage and peak current presented to configurable inputs on the microcontroller 226. The control algorithm 230 is stored in a memory that can be located in the microcontroller 226 or in a separate memory device 272, such as a flash memory. The control algorithm 230 includes machine instructions that are executed by the microcontroller 226. All software executed by the microcontroller 226 including the control algorithm 230 complies with the software safety standard set forth in UL-489 SE and can also be written to comply with IEC-61508. The software requirements comply with UL-1998. As will be explained below, the configurable inputs may be configured as analog-to-digital ("A/D") converter inputs for more accurate comparisons or as an input to an internal comparator in the current measurement circuitry 241 for faster comparisons. In this example, the A/D converter in the current measurement circuitry 241 has a resolution of 8/10 bits, but more accurate A/D converters may be used and may be separate and coupled to the microcontroller 226. The output of the temperature sensor circuit 222 may be presented to the A/D converter inputs of the microcontroller 226.

The configurable inputs of the microcontroller 226 include a power supply capacitor input 232, a reference voltage input 234, a reset input 236, a secondary current input 238, and a scaled secondary current input 240, all of which are coupled to the power supply circuit 216. The microcontroller 226 also includes a temperature input 242 coupled to the temperature sensor circuit 222, and a full load ampere input 244 and an instantaneous trip point input 246 coupled to the user adjustments circuit 224. The user adjustments circuit 224 receives inputs for a full load ampere setting from the full load ampere dial 114 and either a manual or automatic setting for the instantaneous trip point from the instantaneous trip point dial 116.

The microcontroller 226 also has a trip output 250 that is coupled to the trip circuit 218. The trip output 250 outputs a trip signal to cause the trip circuit 218 to actuate the trip solenoid 228 to trip the breaker handle 120 based on the conditions determined by the control algorithm 230. The microcontroller 226 also has a burden resistor control output 252 that is coupled to the power supply circuit 216 to activate current flow across a burden resistor (not shown in FIG. 2) and maintain regulated voltage from the power supply circuit 216 during normal operation.

The breaker handle 120 controls manual disconnect operations allowing a user to manually move the breaker handle 120 to the OFF position 126 (see FIG. 1). The trip circuit 218 can cause a trip to occur based on sensed short circuit conditions from either the microcontroller 226, the over-voltage trip circuit 220 or by installed accessory trip devices, if any. As explained above, the microcontroller 226 makes adjustment of short-circuit pickup levels and trip-curve characteristics according to user settings for motors with different current ratings. The current path from the secondary output of the current transformers 210, 212, 214 to the trip solenoid 228 has a self protection mechanism against high instantaneous fault currents, which actuates the breaker handle 120 at high current levels according to the control algorithm 230.

The over-voltage trip circuit 220 is coupled to the trip circuit 218 to detect an over-voltage condition from the power supply circuit 216 to cause the trip circuit 218 to trip the breaker handle 120 independently of a signal from the trip output 250 of the microcontroller 226. The temperature sensor circuit 222 is mounted on a circuit board proximate to a copper burden resistor (not shown in FIG. 2) together with other electronic components of the motor circuit protector 100. The temperature sensor circuit 222 and the burden resistor are located proximate each other to allow temperature coupling between the copper traces of the burden resistor and the temperature sensor. The temperature sensor circuit 222 is thermally coupled to the power supply circuit 216 to monitor the temperature of the burden resistor. The internal breaker temperature is influenced by factors such as the load current and the ambient temperatures of the motor circuit protector 100. The temperature sensor 222 provides temperature data to the microcontroller 226 to cause the trip circuit 218 to actuate the trip solenoid 228 if excessive heat is detected. The output of the temperature sensor circuit 222 is coupled to the microcontroller 226, which automatically compensates for operation temperature variances by automatically adjusting trip curves upwards or downwards.

The microcontroller 226 first operates the power supply circuit 216 in a startup mode when a reset input signal is received on the reset input 236. A charge mode provides voltage to be stored for actuating the trip solenoid 228. After a sufficient charge has been stored by the power supply circuit 216, the microcontroller 226 shifts to a normal operation mode and monitors the power supply circuit 216 to insure that sufficient energy exists to power the electro-mechanical trip solenoid 228 to actuate the breaker handle 120. During each of these modes, the microcontroller 226 and other components monitor for trip conditions.

The control algorithm 230 running on the microcontroller 226 includes a number of modules or subroutines, namely, a voltage regulation module 260, an instantaneous trip module 262, a self protection trip module 264, an over temperature trip module 266 and a trip curves module 268. The modules 260, 262, 264, 266 and 268 generally control the microcontroller 226 and other electronics of the motor circuit protector 100 to perform functions such as governing the startup power, establishing and monitoring the trip conditions for the motor circuit protector 100, and self protecting the motor circuit protector 100. A storage device 270, which in this example is an electrically erasable programmable read only memory (EEPROM), is coupled to the microcontroller 226 and stores data accessed by the control algorithm 230 such as trip curve data and calibration data as well as the control algorithm 230 itself. Alternately, instead of being coupled to the microcontroller 226, the EEPROM may be internal to the microcontroller 226.

Figure 3:
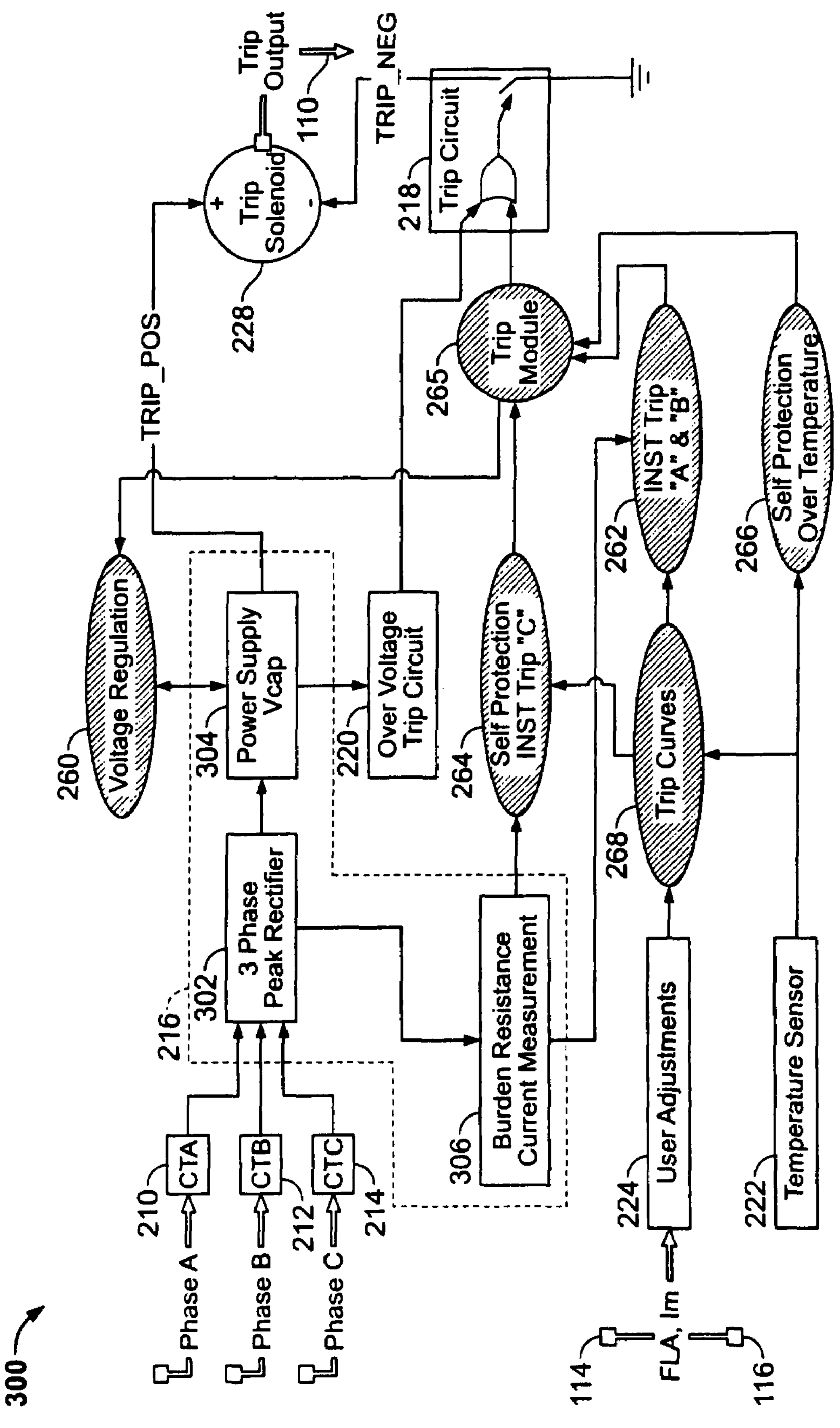
FIG. 3 is a functional block diagram of the operating components of a control algorithm of the motor circuit protector in FIG. 1.

FIG. 3 is a functional block diagram 300 of the interrelation between the hardware components shown in FIG. 2 and software/firmware modules 260, 262, 264, 266 and 268 of the control algorithm 230 run by the microcontroller 226. The secondary current signals from the current transformers 210, 212 and 214 are coupled to a three-phase rectifier 302 in the power supply circuit 216. The secondary current from the three-phase rectifier 302 charges a stored energy circuit 304 that supplies sufficient power to activate the trip solenoid 228 when the trip circuit 218 is activated. The voltage regulation module 260 ensures that the stored energy circuit 304 maintains sufficient power to activate the trip solenoid 228 in normal operation of the motor circuit protector 100.

The trip circuit 218 may be activated in a number of different ways. As explained above, the over-voltage trip circuit 220 may activate the trip circuit 218 independently of a signal from the trip output 250 of the microcontroller 226. The microcontroller 226 may also activate the trip circuit 218 via a signal from the trip output 250, which may be initiated by the instantaneous trip module 262, the self protection trip module 264, or the over temperature trip module 266. For example, the instantaneous trip module 262 of the control algorithm 230 sends a signal from the trip output 250 to cause the trip circuit 218 to activate the trip solenoid 228 when one of several regions of a trip curve are exceeded. For example, a first trip region A is set just above a current level corresponding to a motor locked rotor. A second trip region B is set just above a current level corresponding to an in-rush current of a motor. The temperature sensor circuit 222 outputs a signal indicative of the temperature, which is affected by load current and ambient temperature, to the over temperature trip module 266. The over temperature trip module 266 will trigger the trip circuit 218 if the sensed temperature exceeds a specific threshold. For example, load current generates heat internally by flowing through the current path components, including the burden resistor, and external heat is conducted from the breaker lug connections. A high fault current may cause the over temperature trip module 266 to output a trip signal 250 (FIG. 2) because the heat conducted by the fault current will cause the temperature sensor circuit 222 to output a high temperature. The over temperature trip module 266 protects the printed wire assembly from excessive temperature buildup that can damage the printed wire assembly and its components. Alternately, a loose lug connection may also cause the over temperature trip module 266 to output a trip signal 250 if sufficient ambient heat is sensed by the temperature sensor circuit 222.

The trip signal 250 is sent to the trip circuit 218 to actuate the solenoid 228 by the microcontroller 226. The trip circuit 218 may actuate the solenoid 228 via a signal from the overvoltage trip circuit 220. The requirements for "Voltage Regulation," ensure a minimum power supply voltage for "Stored Energy Tripping." The trip circuit 218 is operated by the microcontroller 226 either by a "Direct Drive" implementation during high instantaneous short circuits or by the control algorithm 230 first ensuring that a sufficient power supply voltage is present for the "Stored Energy Trip." In the case where the "Stored Energy" power supply voltage has been developed, sending a trip signal 250 to the trip circuit 218 will ensure trip activation. During startup, the power supply 216 may not reach full trip voltage, so a "Direct Drive" trip operation is required to activate the trip solenoid 228. The control for Direct Drive tripping requires a software comparator output sense mode of operation. When the comparator trip threshold has been detected, the power supply charging current is applied to directly trip the trip solenoid 228, rather than waiting for full power supply voltage.

The over-voltage trip circuit 220 can act as a backup trip when the system 200 is in "Charge Mode." The control algorithm 230 must ensure "Voltage Regulation," so that the overvoltage trip circuit 220 is not inadvertently activated. The default configuration state of the microcontroller 226 is to charge the power supply 216. In microcontroller control fault scenarios where the power supply voltage exceeds the over voltage trip threshold, the trip circuit 218 will be activated. Backup Trip Levels and trip times are set by the hardware design.

The user adjustments circuit 224 accepts inputs from the user adjustment dials 114 and 116 to adjust the motor circuit protector 100 for different rated motors and instantaneous trip levels. The dial settings are converted by a potentiometer to distinct voltages, which are read by the trip curves module 268 along with temperature data from the temperature sensor circuit 222. The trip curves module 268 adjusts the trip curves that determine the thresholds to trigger the trip circuit 218. A burden circuit 306 in the power supply circuit 216 allows measurement of the secondary current signal, which is read by the instantaneous trip module 262 from the peak secondary current analog-to-digital input 238 (shown in FIG. 2) along with the trip curve data from the trip curves module 268. The self-protection trip module 264 also receives a scaled current (scaled by a scale factor of the internal comparator in the current measurement circuitry 241) from the burden resistor in the burden circuit 306 to determine whether the trip circuit 218 should be tripped for self protection of the motor circuit protector 100. In this example, fault conditions falling within this region of the trip curve are referred to herein as falling within region C of the trip curve.

As shown in FIGS. 2 and 3, a trip module 265 is coupled between the trip circuit 218 and the voltage regulation module 260. Trip signals from the instantaneous trip module 262, the self protection trip module 264, and the over temperature trip module 266 are received by the trip module 265.

Embedded software 230 is provided for switching a trip unit, such as the motor circuit protector 100, when detecting a failure mode in the trip unit. The software 230 implements switch detection algorithms that include failure mode detection. The algorithm 230 can be used on any trip unit system that accesses calibrated trip pick-up data, including the motor circuit protector 100. As described in more detail in connection with FIGS. 4A and 4B, the software translates user-adjustable trip unit settings to pick-up levels by accessing stored calibrated trip data in a data table. Specifically, the translation technique includes data compression of trip point data, diagnostic checksums, switch to trip point memory mapping, and extension of data settings to elevated temperatures. Normalized templates including normalized trip point data are used as a starting point for calibrating the embedded software.

Aspects of the present invention enable a fail-safe operation mode where user adjustments (such as adjustments of the full load ampere dial 114 and/or the instantaneous trip point dial 116) can revert to predetermined protective levels. An electronic circuit for a potentiometer is configured to present a percentage of a microcontroller's analog/digital ("A/D") full scale to an A/D input pin, where one channel is used for each user adjustment position.

The user adjustment circuit 224 can be used as a switch for detecting an open contact fault, a short-to-ground fault, and/or a short to a supplied or reference voltage. As described in more detail below in reference to FIGS. 5A-11B, the potentiometer is coupled with an adjustment button, which is generally a mechanical button, that includes switch-like stop and detent features for translating mechanical orientation angles to a potentiometer mechanical orientation. The user adjustment circuit 224 can be adjusted by rotating a dial similar to the full load ampere dial 114 and/or the instantaneous trip point dial 116.

Aspects of the present invention provide numerous improvements and benefits. In an example, the potentiometer's vulnerability to electrostatic discharge ("ESD") is decreased by increasing an over-surface distance of the adjustment button. The adjustment button interacts with a cover to increase the likelihood that the adjustment button will easily rotate only to a designed switch position, not to an unintended in-between position. The adjustment button interacts with the cover to have increased consistent feel to a user by incorporating, for example, three detent pressure arms (or spring elements) located symmetrically around the user adjustment button 120 degrees apart.

In another example, low cost components can be utilized (while achieving improved over-all system performance), eliminating need for switch calibration, and providing the ability to use quantitative techniques to verify switch performance in a production test process. Trip unit products can be easily and securely updated, independent of embedded software product design. For example, trip point changes in relation to switch settings can be made without changing product software code as long as data points are within a maximum/minimum range.

Referring to switch calibration and switch performance, a statistical distribution of data corresponding to switch settings can be used to determine position thresholds. The position thresholds and device performance are monitored for each trip unit. Additionally, automated process techniques can be used during product development to quantitatively monitor user adjustment performance. For example, mechanical torque, angular orientation, and microprocessor data have correlated profiles that can be quantitatively adapted for monitoring user-adjustment performance. This quantitative approach is an improvement over an approach that requires manual inspection of mechanical user adjustment.

The automated process technique involves a functional tester with two motors that can rotate the switches 114, 116 to any position. The motors are coupled to motor drivers that detect the amount of current needed to drive each switch 114, 116 to different positions. A torque can be derived directly from this current, and the rotation (in degrees) can be derived from the torque or from optical decoders in the motors that detect the amount of rotation a motor shaft has turned. The functional tester is coupled to communicate the switch rotation angle to the microcontroller 226. The automated process technique automatically rotates the switches 114, 116 to various positions, measures the corresponding torque required to put the switches into the various positions, calculates the angle of rotation (i.e., the distance traveled by the motor) from the torque or from the optical decoders, and communicates, via the microcontroller 226, an A/D count that represents the voltage level from a potentiometer 510.

Figure 4A:
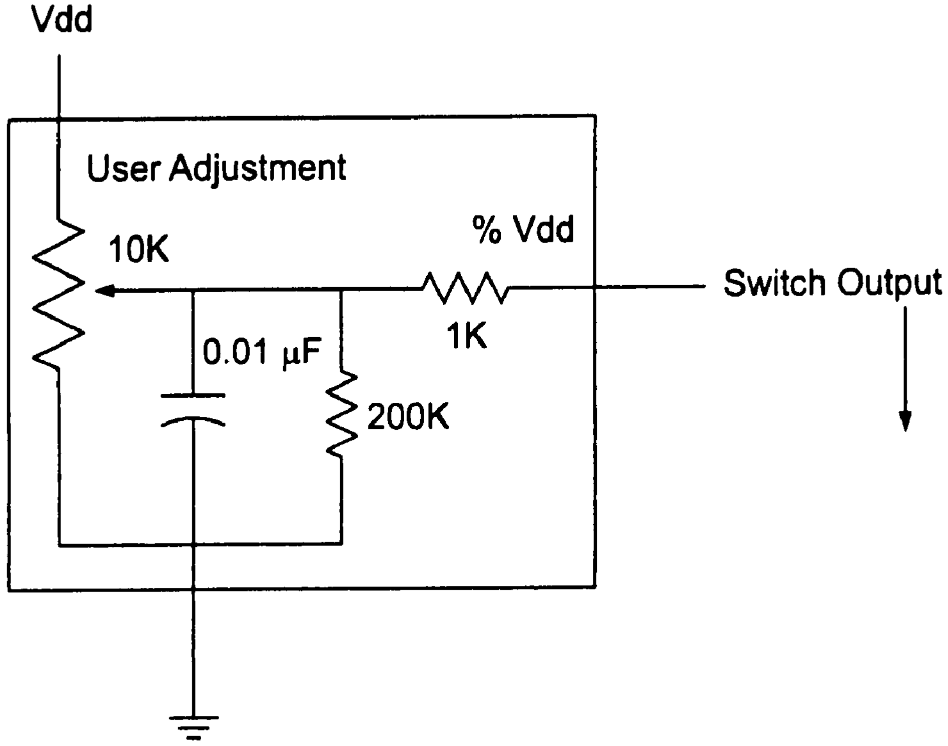
FIG. 4A is a functional electrical schematic of an user adjustment switch for use with the motor circuit protector of FIG. 1.
Figure 4B:
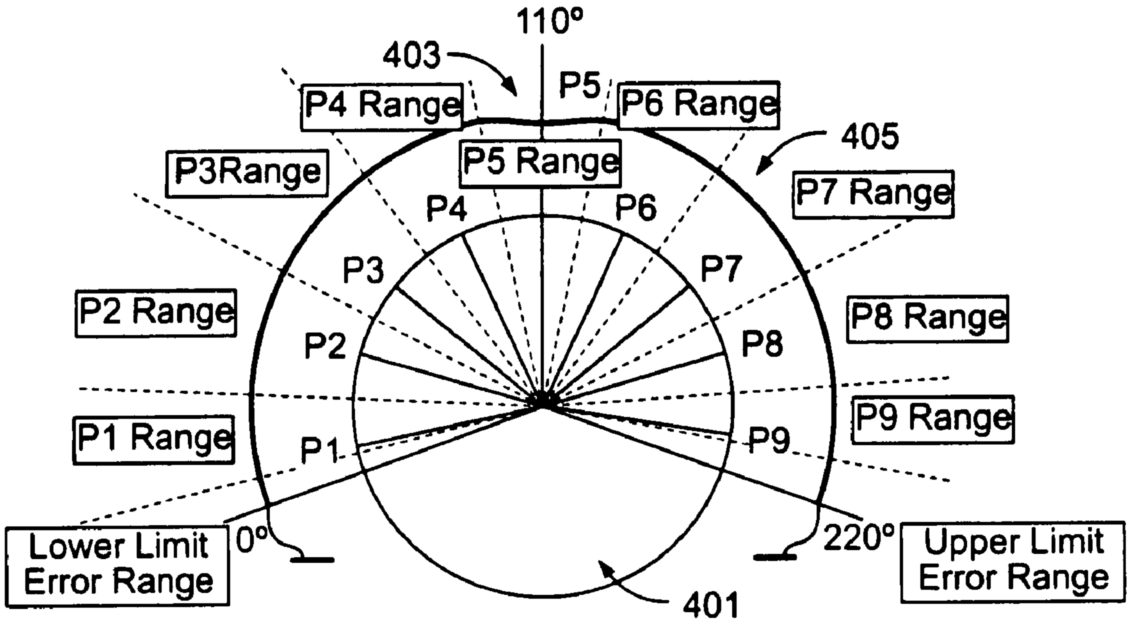
FIG. 4B is an illustration of an electro-mechanical orientation for adjustment in accordance with the diagram of FIG. 4A.

FIGS. 4A and 4B illustrate an electrical schematic of a user-adjustment button and a plurality of electromechanical orientations (i.e., "P1"-"P9"), respectively. Thus, P1 corresponds to a first position of the user-adjustment button, P2 corresponds to a second position, and so on. Switch position ranges, P1 Range through P9 Range, correspond to respective ranges of mechanical orientation positions of the user-adjustment button. For example, if the user-adjustment button has a mechanical orientation position anywhere within P1 Range, then its position is P1. An important aspect of this implementation is that there is a lack of continuity between switch position ranges. Each position range is continuous with respect to its neighboring position range(s). This avoids having any "deadman" zones wherein the button position cannot be ascertained. A lower limit error range and an upper limit error range define the lower and upper limits, respectively, beyond which invalid positions are found. The electro-mechanical orientations are generally mechanical switch orientations of a user-adjustment button that are translated to corresponding analog signal levels by way of a resistive potentiometer. The button and the user adjustment circuit are described in more detail below in reference to FIGS. 5A-11B.

The user adjustment circuit is mechanically aligned with the user-adjustment button so that button position "P5" 403 is nominally at 50% resistance. An analog/digital ("A/D") reference voltage ("Vdd") is presented to a switch circuit, and each analog voltage converted by the A/D converter into corresponding digital values can be expressed as a percentage of the reference voltage (i.e., "% Vdd").

The mechanical orientation of the switch relative to a resistive element of the potentiometer sets a signal presented to a microcontroller for measurement. According to an implementation of the present invention, the mechanical design of the switch is illustrated as a nine-position switch, with a "Detent" feature in-between positions and "Stop" features at the switch extremes (i.e., "P1" and "P9"). Table 1 shows some of the electro-mechanical parameters considered in the software design.

TABLE 1

User Adjustment Switch Electro-Mechanical Orientation

| Description | Parameter | Units | Conditions | Max | Nominal | Min |
|---|---|---|---|---|---|---|
| Number of Switch Positions | Pi | [dec] | | 9 | — | 1 |
| Switch Angular Reference Position | SW_REF_POS | [Position] | | — | P5 | — |
| Switch Reference Angles | | [degree] | Orientation CCW, Center, CW | 220 | 110 | 0 |
| Nominal Switch Step | SW_STEP | [degree] | | — | 24 | — |

The switch positions can be determined from experimental test results of voltages at the microcontroller's inputs for each of the desired mechanical positions, i.e., A/D inputs also referred to as "FLA" (full load amperes) and "Im" (instantaneous trip point current) inputs. The movement of the switch within a particular position is considered and expressed as a maximum voltage allowable value and a minimum voltage allowable value. These voltage values may be expressed as a percentage of the switch reference voltage or as the equivalent respective 8 bit A/D threshold values, such as, e.g., the threshold values (also referred to as "thresholds") illustrated below in Table 2.

TABLE 2

Switch Thresholds Expressed As 8 Bit Decimal A/D Thresholds

| Description | Parameter | Software Logical Position | Units | Mechanical Orientation | Max | Nominal | Min |
|---|---|---|---|---|---|---|---|
| Switch Low Error | P0, FLA, Im | Position 1 | [dec] | — | 3 | — | 0 |
| Switch Position 1 | P1, FLA, Im | Position 1 | [dec] | Position 1 | 25 | 15 | 4 |
| Switch Position 2 | P2, FLA, Im | Position 2 | [dec] | Position 2 | 51 | 39 | 26 |
| Switch Position 3 | P3, FLA, Im | Position 3 | [dec] | Position 3 | 79 | 66 | 52 |
| Switch Position 4 | P4, FLA, Im | Position 4 | [dec] | Position 4 | 110 | 95 | 80 |
| Switch Position 5 | P5, FLA, Im | Position 5 | [dec] | Position 5 | 143 | 127 | 111 |
| Switch Position 6 | P6, FLA, Im | Position 6 | [dec] | Position 6 | 173 | 159 | 144 |
| Switch Position 7 | P7, FLA, Im | Position 7 | [dec] | Position 7 | 200 | 187 | 174 |
| Switch Position 8 | P8, FLA, Im | Position 8 | [dec] | Position 8 | 226 | 214 | 201 |
| Switch Position 9 | P9, FLA, Im | Position 9 | [dec] | Position 9 | 249 | 238 | 227 |
| Switch High Error | P10, FLA, Im | Position 1 | [dec] | — | 255 | — | 250 |

Switch error detection is accomplished by implementation of a "SW_HIGH_ERR" specification, independently, for both "FLA" and "Im" switches. If a switch is oriented past a stop-feature maximum limit, then a switch error will be to detected and the switch logic shall revert to a specified position, such as illustrated in Table 2. For example, when the "SW_HIGH_ERR" limit is reached, both the "FLA" and the "Im" switches default to position 1 setting, independently.

Analogously, trip points stored in the EEPROM 270 (there are 81 in a specific aspect, which represent high temperature settings) are associated with 27 FLA and Im position combinations. A diagnostic routine periodically adds up all the trip point data values and compares the summed values against a checksum. If the checksum does not match the summed values, a Diagnostics Trip will occur, eventually causing the MCP 100 to trip. Alternately, instead of causing a Diagnostics Trip, the diagnostic routine can revert to predetermined trip point settings. In an aspect, the predetermined settings are set to a low pickup level. In this manner, the integrity of trip points and trip data stored in the EEPROM 270 can be verified. When the verification fails, either tripping can occur, or the trip curve settings can be automatically reverted to predetermined low pickup settings.

On start-up, switch positions should be determined before attempting instantaneous ("INST") trip detection. Optionally, it is permissible to read an adjacent switch position at the minimum/maximum extremes of the mechanical adjustments. However, the software 230 should read the correct switch positions at the nominal (or center) mechanical switch adjustment markings. Labels identifying the adjustment markings should be aligned to mechanical specifications.

A user adjusts the switch positions, either from an "Energized" or "De-energized" state. The software design considers one or more of the electrical and software parameters shown below in Table 3. While the application is running, the switch settings are updated at the "Switch Change Perception" rate. A minimum "Switch Change Perception" rate may be specified to spread over time a temperature compensation calculation.

TABLE 3

User Adjustment Switch Electrical Parameters

| Description | Parameter | Units | Conditions | Max | Nominal | Min |
|---|---|---|---|---|---|---|
| Switch Change Perception | SW_UPDATE_TIME | [mS] | | — | 150 | — |
| Switch & A/D Reference Voltage | Vdd or FSv | [Volts] | | — | 5 | — |
| Switch A/D Resolution | | [bits] | | — | 8 | — |

FSv corresponds to the full-scale voltage of the A/D converter to which the FLA and Im inputs 244, 246 are coupled. For example, FSv may correspond to 5 volts (nominal). The A/D converter may be part of the measurement circuit 241 shown in FIG. 2. Note, for clarity, the measurement circuit 241 is shown coupled to inputs 232, 238, and 240. However, it is understood that the measurement circuit may also be coupled to inputs 244, 246. Alternately, the inputs 244, 246 may be presented to another A/D converter, either in the microcontroller 226 or external to the microcontroller 226.

Switch position settings may determine product trip curve settings. These settings are realized by implementing a switch to an EEPROM 270 trip point lookup algorithm. The same translation algorithm can be implemented in a plurality of circuit breakers. Each switch setting permutation may correspond to a specified pair of "A" and "B/C" trip points as per breaker trip settings specifications.

The "A" and "B/C" trip points may be implemented as 16 bit words in 8 bit EEPROM memory 270. The formatting of "A" and "B" trip data can be identical and 10 bit left justified. The "C" trip points are packed within the "B/C" word and 5 bit right justified. This trip data organization is convenient for implementing the switch translation algorithm, specified by the equations listed below in Table 4.

| Trip Region | Size | EEPROM Words [16bit] | EEPROM Bytes [8bit] |
|---|---|---|---|
| "A" | 10 bits | 27 | 54 |
| "B" | 10 bits | 81 | 162 |
| "C" | 5 bits | 81 | 162 |

The software trip curve settings are dependent on the combination of "FLA" and "Im" user adjustment switches 114, 116. For example, in an implementation, there are nine different FLA settings, in addition to nine "Im" settings for each of the "FLA" settings. This is equivalent to eighty-one different trip curve profiles for the circuit breaker 100. Each of the eighty-one different settings correspond to a different trip profile.

The following exemplary table lists for each breaker size, the FLA settings corresponding to each of the switch positions 1-9 of the FLA dial 114. For example, the circuit breaker 100 may have a current rating of 30 A rms, 50 A rms, etc. For each current rating, there are different FLA settings as set forth in the table below.

TABLE 4

Equations for Trip Points "A" and "B/C"

| Description | Parameter | Units | Equation/{Notes} |
|---|---|---|---|
| Lookup Thresholds B/C | "B/C" | [16 bit word] Where: [B/C] = [B/C:H] + [B/C:L] | B/C:H = (SW1 − 1) * 18 + (SW2 − 1) * 2 + 54<br>B/C:L = (SW1 − 1) * 18 + (SW2 − 1) * 2 + 55 |
| Lookup Thresholds A | "A" | [16 bit word] Where:[A] = [A:H] + [A:L] | if (SW1 < 4)<br>A:H = (SW1 − 1) * 18 + (SW2 − 1) * 2<br>A:L = (SW1 − 1) * 18 + (SW2 − 1) * 2 + 1<br>Else (A = B) |

Note that in Table 4, the convention "[x:H]" is the high byte of word x, while "[x:L]" is the low byte of word x. Also, the "SW1" and "SW2" variables correspond respectively to the "FLA" and "Im" switch positions, 1 through 9.

As stated above, the trip curve profiles are stored in the EEPROM memory 270. The various combinations of "FLA" 114 and "Im" 116 adjustments will cause the control algorithm 230 to point to specific pickup values stored in EEPROM memory 270. The EEPROM values will represent the actual A/D pickup levels for the corresponding settings.

In an implementation, there are twenty-seven independent trip regions "A," for each of the breakers, specifically for the first three "Im" switch 116 positions. For all remaining "Im" switch 116 positions, trip region "A" equals "B" and region "C" exists. Table 5.13.1 shows the storage requirements for trip curve implementation in the EEPROM 270.

Trip Curve Adjustment "FLA"

| Breaker Size [Arms] | Requirement Switch Positions 1 to 9 FLA Settings, "Full Load Amps," units [Arms] |
|---|---|
| 30 | 1.5, 3, 6, 8, 11, 14, 17, 20, 25 |
| 50 | 14, 17, 21, 24, 27, 29, 32, 36, 42 |
| 100 | 30, 35, 41, 46, 51, 56, 63, 71, 80 |
| 150 | 58, 71, 79, 86, 91, 97, 110, 119, 130 |
| 250 | 114, 137, 145, 155, 163, 172, 181, 210, 217 |

Likewise, for each "Im" (instantaneous trip point current), there is defined a set of auto setting multipliers and manual settings corresponding to FLA multiples. The following table lists examples of such settings.

| Trip Curve Adjustment "Im" | |
|---|---|
| Breaker Size [Arms] | Requirement<br>Switch Positions 1 to 9<br>Manual settings 6x through 13x are FLA multiples |
| 30 | Auto1, Auto2, 6x, 8x, 9x, 10x, 11x, 12x, 13x |
| 50 | Auto1, Auto2, 6x, 8x, 9x, 10x, 11x, 12x, 13x |
| 100 | Auto1, Auto2, 6x, 8x, 9x, 10x, 11x, 12x, 13x |
| 150 | Auto1, Auto2, 6x, 8x, 9x, 10x, 11x, 12x, 13x |
| 250 | Auto1, Auto2, 6x, 8x, 9x, 10x, 11x, 12x, 13x |

For each FLA-Im combination, there are stored in the EEPROM 270 for each trip curve A, B, C, the peak rms primary current Ip, the peak primary current Ip, and the peak secondary current Is.

Figure 4C:
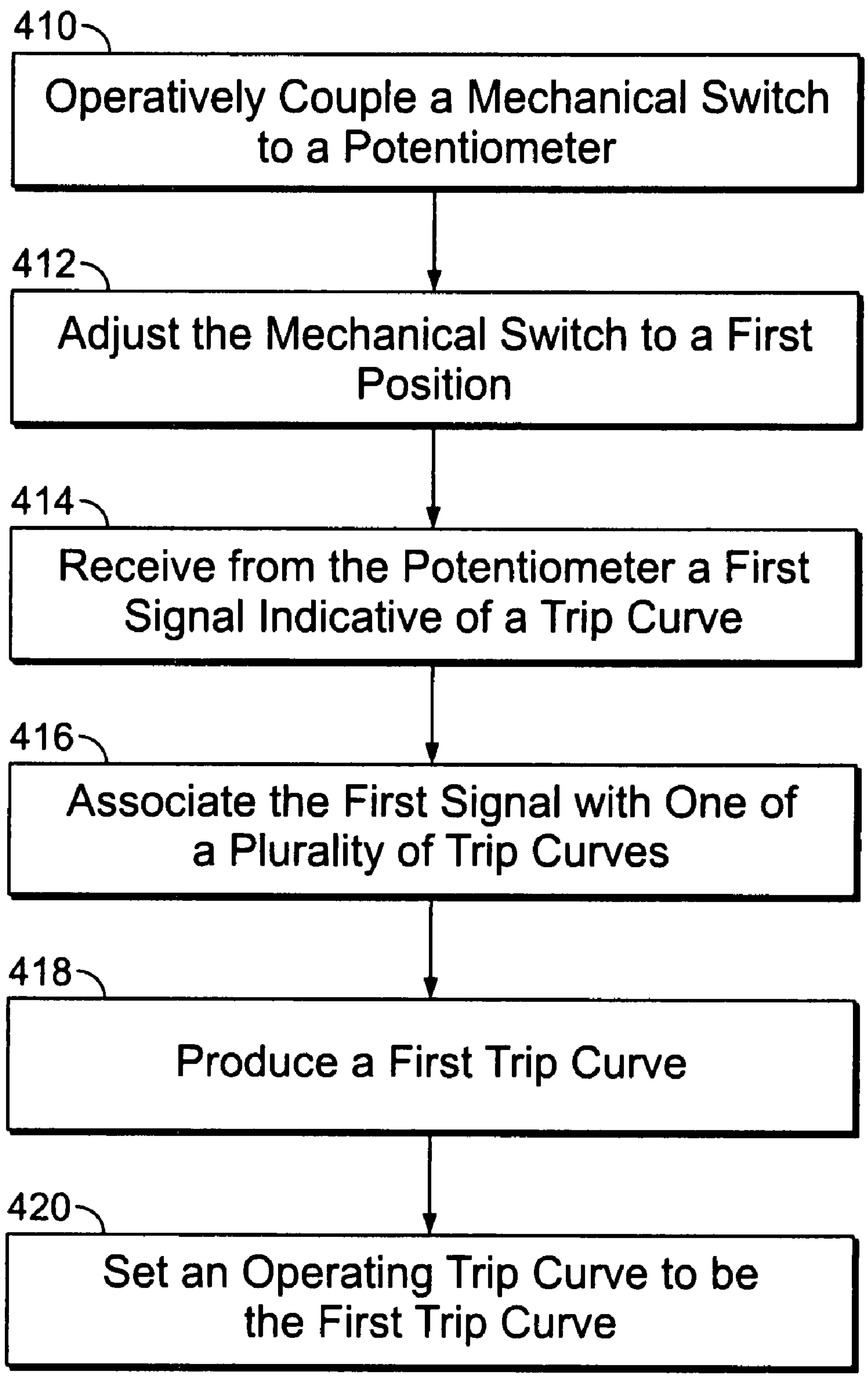
FIG. 4C is a flowchart diagram for setting an operating trip curve of the motor circuit protector of FIG. 1 by adjusting a mechanical switch.

FIG. 4C is a flowchart illustrating the coupling of a mechanical button to a user adjustment circuit for setting an operating trip curve in a circuit breaker. The mechanical button is operatively coupled to the potentiometer (410). For example, the mechanical button can be operatively coupled to the user adjustment circuit as described below in reference to FIGS. 5A-10. Accordingly, adjustment of the mechanical button results in adjustment of the user adjustment circuit.

The mechanical button is adjusted to a first position (412). The mechanical adjustment causes a first signal to be received from the user adjustment circuit (414). The first signal is indicative of a trip curve. The first signal is associated with one of a plurality of trip curves (416) and a first trip curve is produced in response to the association between the first signal and the plurality of trip curves (418). An operating trip curve is set to be the first trip curve (420).

Figure 5A:
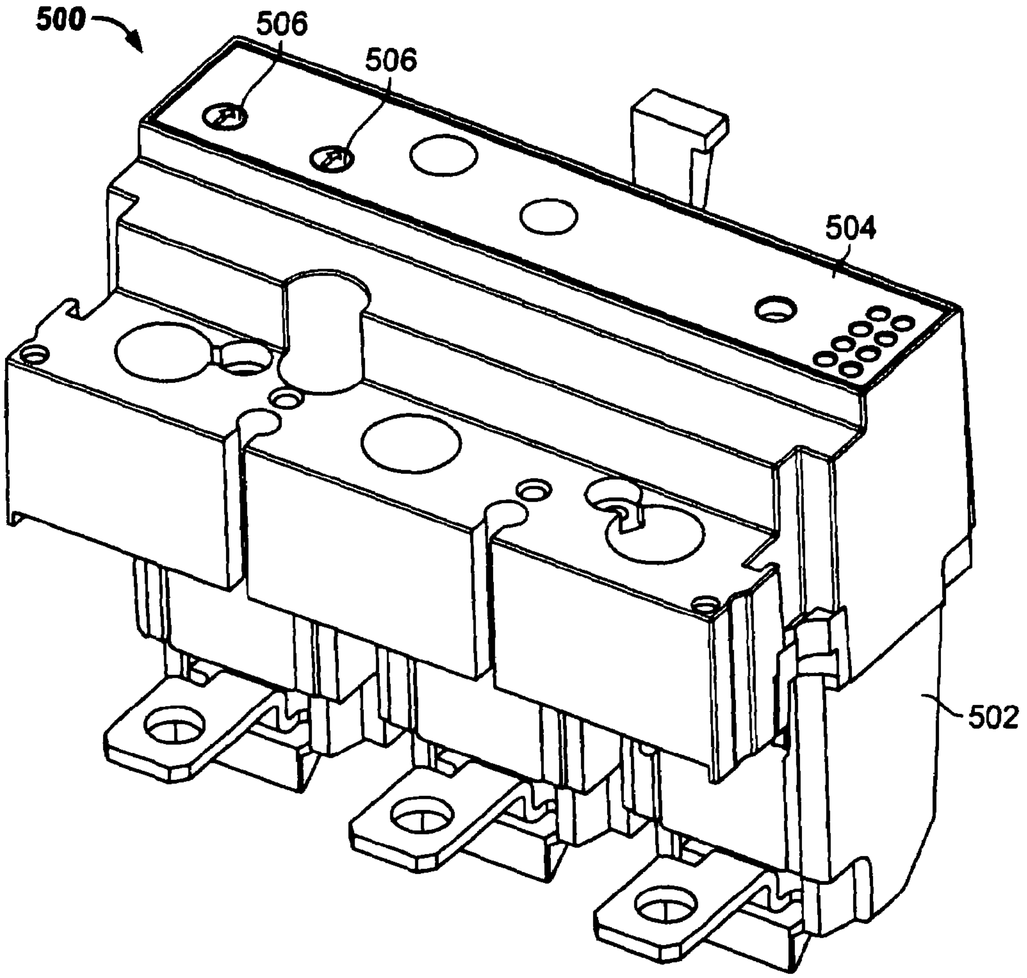
FIG. 5A is a perspective view of a trip unit assembly according to an alternative implementation of the present application.
Figure 5B:
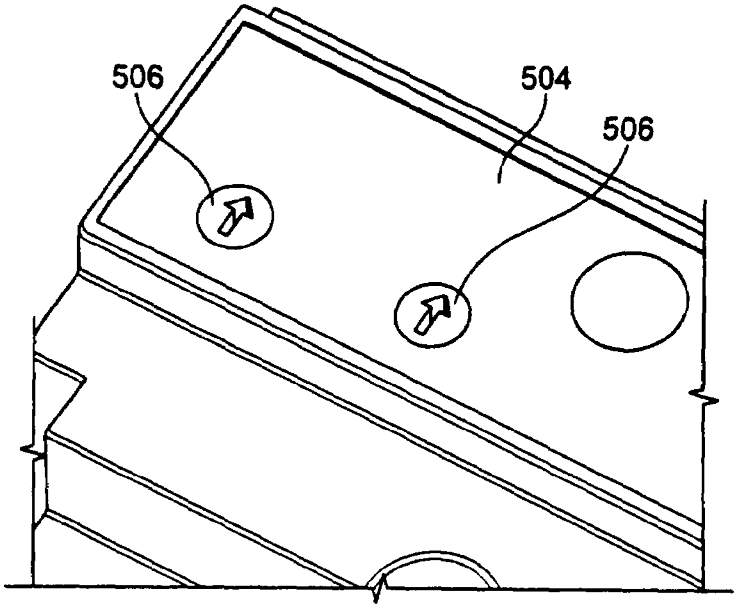
FIG. 5B is an enlarged view of a top portion of the trip unit assembly of FIG. 5A.

FIGS. 5A and 5B illustrate a trip unit assembly 500 that generally includes one or more copper components to carry electrical current, a set of current transformers (one per phase) to measure the electrical current, and a circuit board to process information. The trip unit assembly 500 is an alternative embodiment of the motor circuit protector 100 and can generally include similar components and operate as described above in reference to FIGS. 1-3. The internal components of the trip unit assembly 500 (e.g., copper components, circuit board, etc.) are contained within a base 502 and a cover 504 of the trip unit assembly 500. In addition, the trip unit assembly 500 includes one or more user adjustment buttons 506 for controlling electrical current trip curves of the trip unit assembly 500. These buttons 506 may correspond to the FLA dial 114 and the instantaneous trip point dial 116 shown in FIGS. 1-3.

Figure 6:
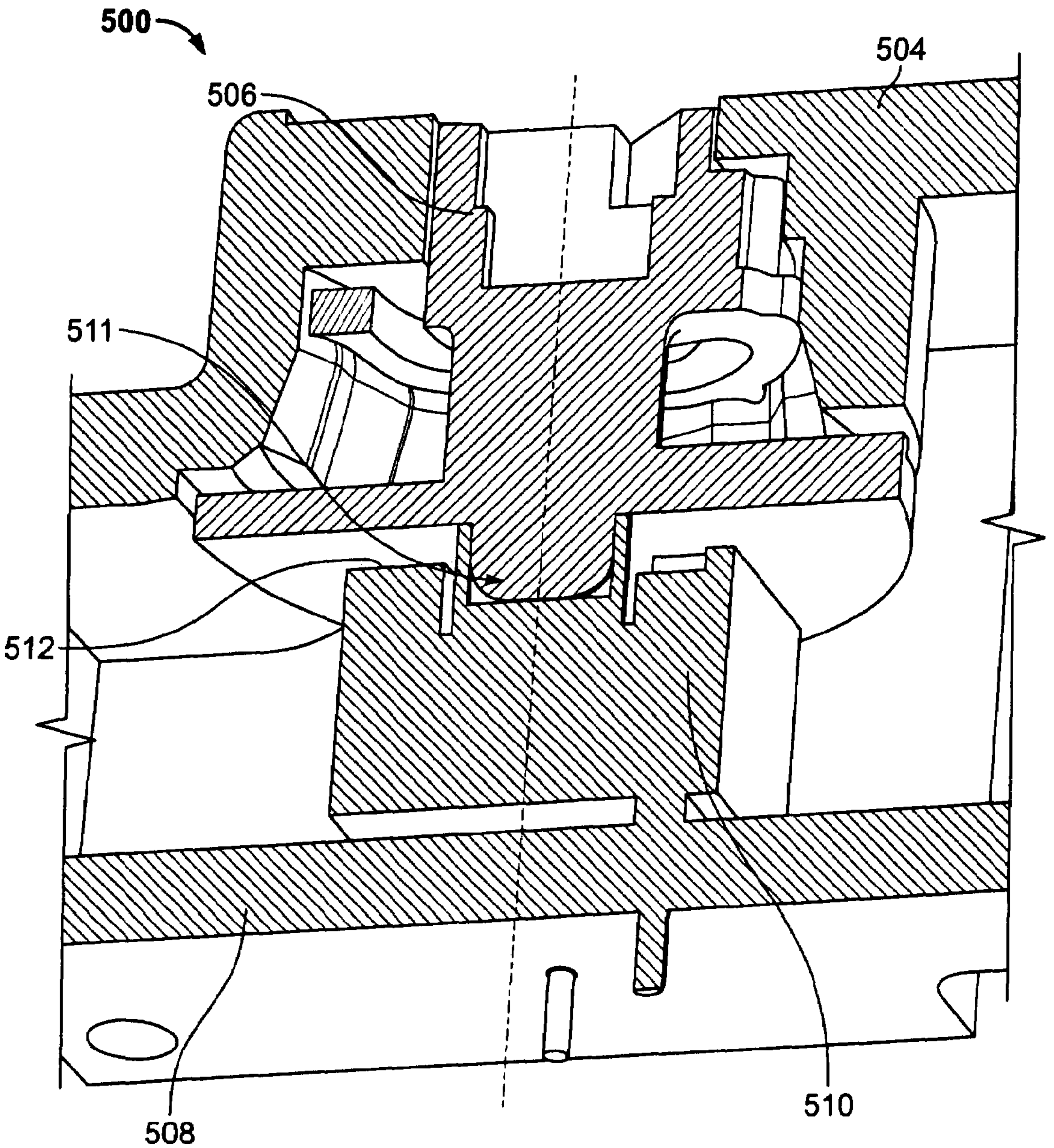
FIG. 6 is a cross-sectional view showing a portion of the trip unit assembly of FIG. 5A at a rotational center of an adjustment switch.

FIG. 6 illustrates a partial cross-sectional view of the trip unit assembly 500 at a rotational center of one of the adjustment button 506. The trip unit assembly 500 includes a printed wire assembly 508 to which a potentiometer 510 is attached. The potentiometer 510 has a shaped pocket 511 at a top face of a potentiometer button 512 for receiving snugly the corresponding adjustment button 506. The potentiometer button 512, via the shaped pocket 511, connects the adjustment button 506 and the potentiometer 510 during rotational movement of the button 506. The cover 504 encapsulates an upper portion of the adjustment button 506.

Figure 7A:
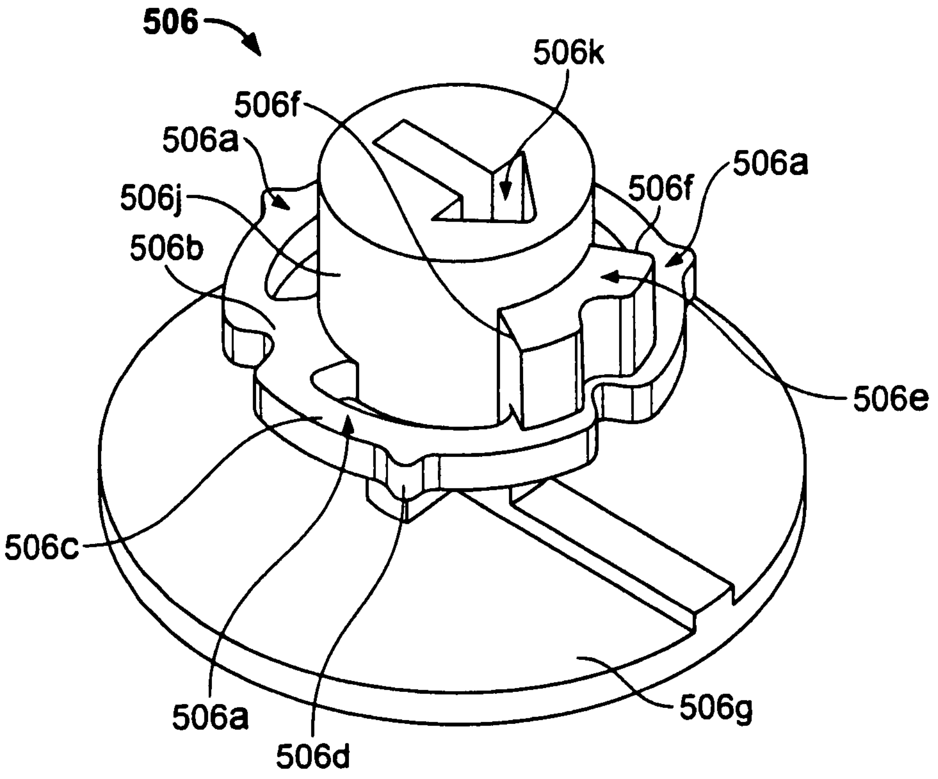
FIG. 7A is a top perspective view of the adjustment switch of FIG. 6.
Figure 7B:
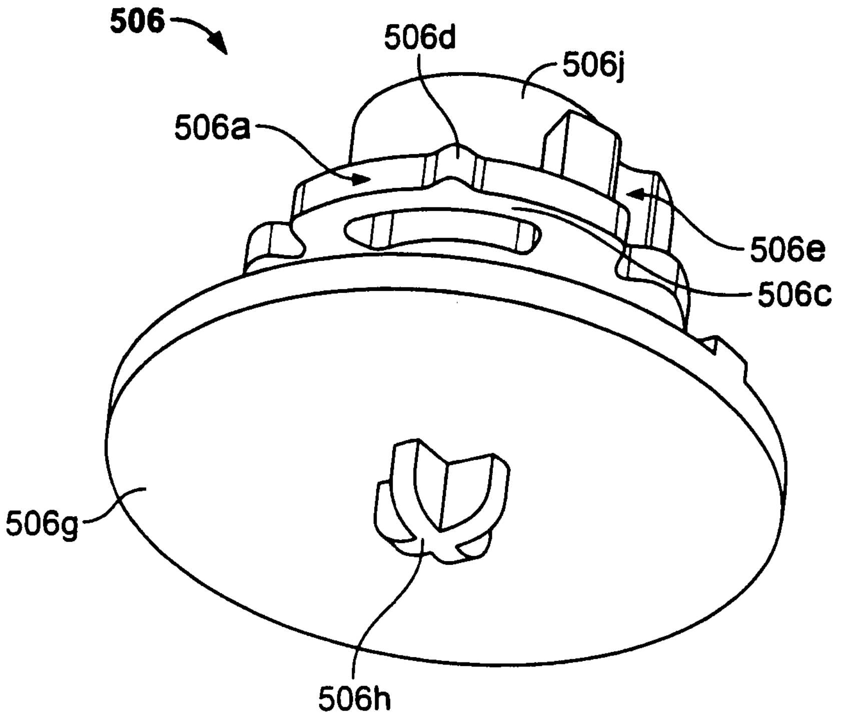
FIG. 7B is a bottom perspective view of the adjustment switch of FIG. 6.

FIGS. 7A and 7B illustrate features of the adjustment button 506. Specifically, the adjustment button 506 includes a spring element 506*a*, a rigid base 506*b*, a flex member 506*c*, a location nipple 506*d*, a stop 506*e*, a stopping surface 506*f*, an insulation disc 506*g*, a protrusion 506*h*, and a shoulder 506*j*. The adjustment button 506 can include any number of features in accordance with the claimed invention. For example, the illustrated adjustment button 506 includes three spring elements 506*a* and two stopping surfaces 506*f*.

The spring element 506*a* includes the rigid base 506*b*, the flex member 506*c*, and the location nipple 506*d*. The rigid base 506*b* is in direct contact with the shoulder 506*j* and connects two flex members 506*c* of respective adjacent spring elements 506*a*. A gap separates the flex member 506*c* and the shoulder 506*j*, and the location nipple 506*d* is located generally in a central location of the flex member 506*c*.

The stop 506*e* is located generally over one of the rigid bases 506*b* and is in contact with the shoulder 506*j*. Furthermore, the stop 506*e* includes the two stopping surfaces 506*f*, which are symmetrically located at opposing ends of the stop 506*e*.

The shoulder 506*j* is generally a cylinder centrally located on top of the insulation disc 506*g*. The shoulder 506*j* is surrounded by the spring elements 506*a* and the stop 506*e*. Starting on a top surface of the shoulder 506*j*, an arrow-shaped blind hole 506*k* is provided for receiving a tool when rotational movement of the adjustment switch 506 is required.

The insulation disc 506*g* is located at the bottom of the adjustment button 506, below the shoulder 506*j*. The insulation disc 506*g* has a diameter that is greater than the diameter of the shoulder 506*j*, to increase resistance to ESD and to provide protection against pollutants entering the cavity located between the insulation disc 506*g* and the printed wire assembly 508. When a user, such as a customer, touches a top exterior surface of the cover 504, static electricity carried by the user may try to reach internal electronics through air or over surfaces located between the adjustment button 506 and the cover 504. The insulation disc 506*g* increases the distance that ESD needs to travel to go from a front face of the adjustment button 506 (e.g., a top surface of the adjustment button 506 in which the arrow-shaped hole 506*k* is located) to the potentiometer 510 and other components on the printed wire assembly 508. Thus, the insulation disc 506*g* increases ESD protection by increasing through-air or over-surface distance of the adjustment button 506. In addition, the insulation disc 506*g* protects against pollutants (such as environmental debris, dust, oil, and the like) from entering the cavity between the insulation disc 506*g* and the printed wire assembly 508, which may interfere with the potentiometer 510.

To increase ESD protection of the potentiometer 510, a bottom surface of the insulation disc 506*g* is greater than the bottom face of the potentiometer 510. For example, as more clearly shown in FIG. 6, the insulation disc 506*g* has a diameter that is greater than the largest dimension of the potentiometer button 512. Thus, the bottom surface of the insulation disc 506*g* is shaped and sized such that it exceeds the largest dimension of the potentiometer button 512 to protect the potentiometer 510 from ESD and/or pollutants. The larger size of the insulation disc 506*g* also prevents application of down force on the potentiometer button 512, thereby protecting the potentiometer button 512 from damage.

The protrusion 506*h* is centrally located on a bottom surface of the insulation disc 506*g* and has a cross-shaped profile. The illustrated embodiment of the protrusion 506*h* is also referred to as an "X" style protrusion.

Figure 8A:
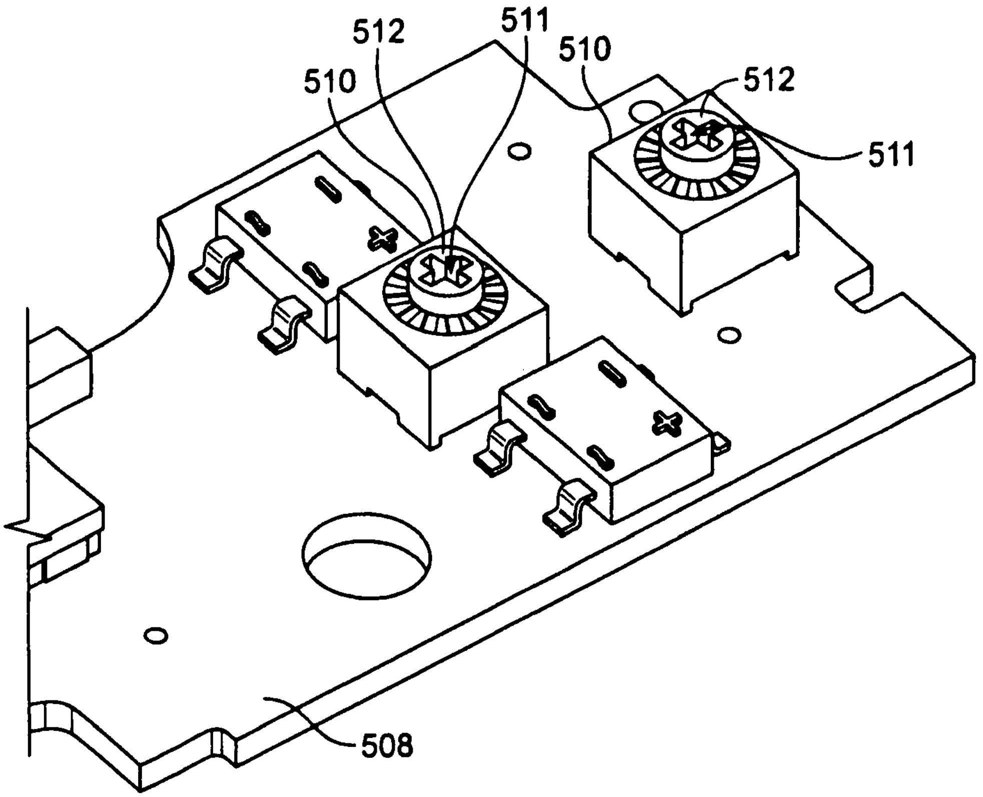
FIG. 8A is a perspective view of a printed wire assembly including two potentiometers according to another alternative implementation of the present application.
Figure 8B:
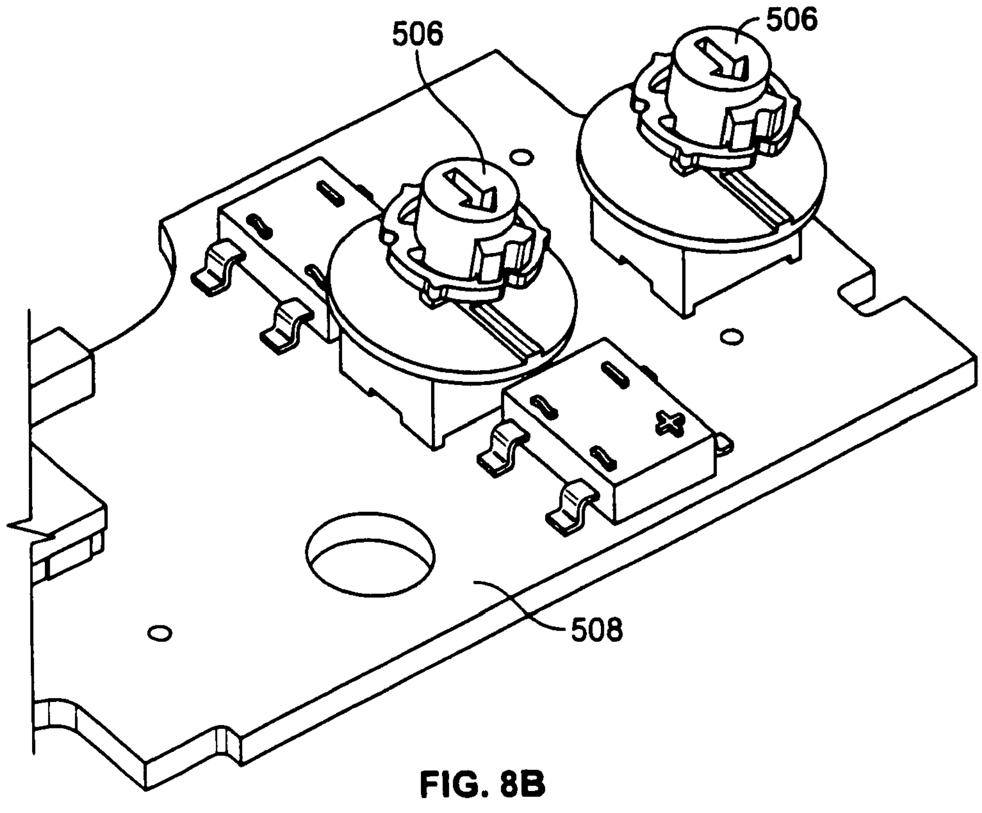
FIG. 8B is a perspective view of the printed wire assembly of FIG. 8A including two adjustment switches coupled to the two potentiometers.

FIGS. 8A and 8B illustrate the printed wire assembly 508 having two potentiometers 510. Each potentiometer 510 has a rotational center with the pocket 511 on the potentiometer button 512 for receiving a respective protrusion 506*h*. Specifically, the pocket 511 is an "X" style pocket for receiving the respective "X" style protrusion 506*h*. The adjustment switches 506 are assembled correspondingly on the potentiometers 510, with the "X" style protrusion 506*h* being snugly inserted into the "X" style pocket 511 of a respective potentiometer button 512.

Figure 9B:
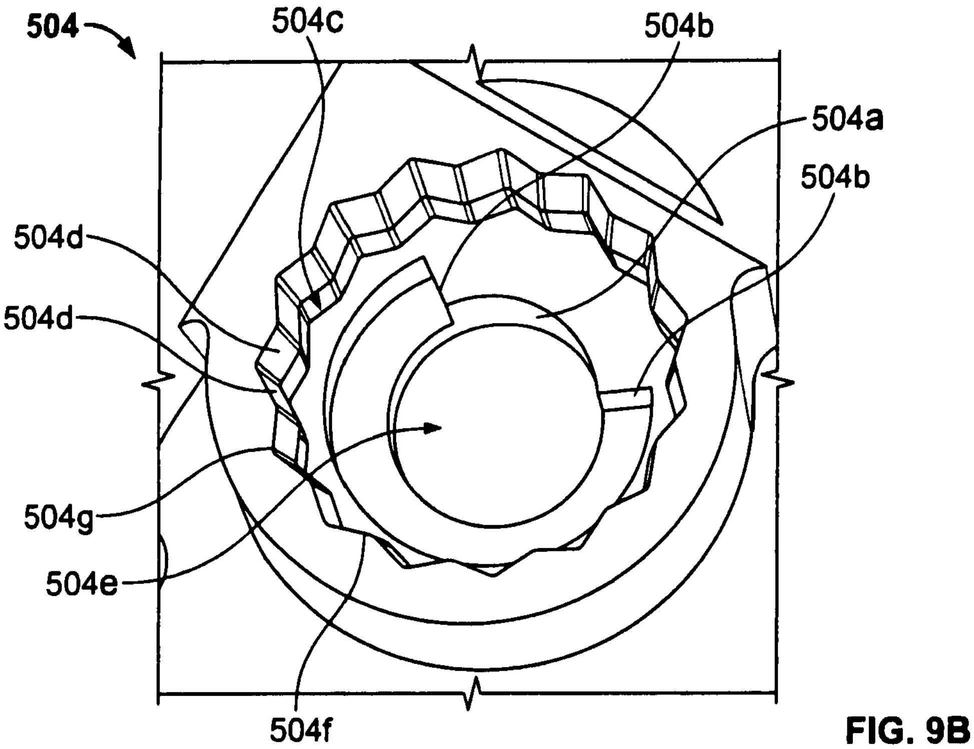
FIG. 9B is an enlarged bottom perspective view illustrating a hole in the cover of the trip unit assembly of FIG. 5A.
Figure 9A:
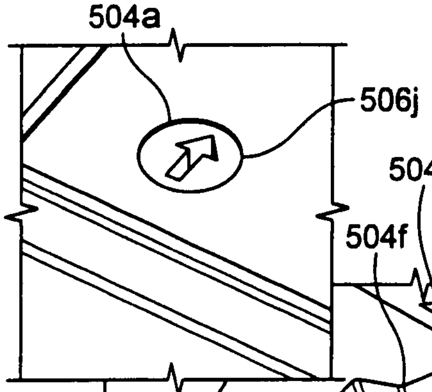
FIG. 9A is an enlarged view showing the adjustment switch inserted into a cover of the trip unit assembly of FIG. 5A.
Figure 9C:
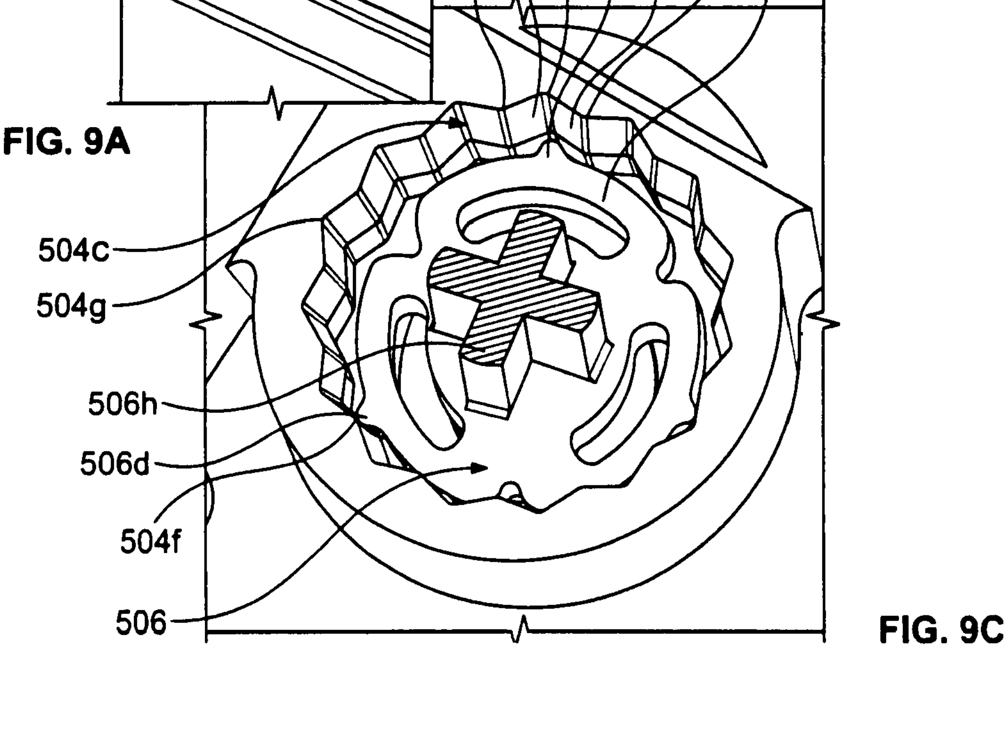
FIG. 9C illustrates a cross-sectioned portion of the adjustment switch of FIG. 6 inserted into the hole of FIG. 9B.

FIGS. 9A-9C illustrate the interaction between the adjustment switch 506 and the cover 504 (viewing from inside the cover in FIGS. 9B and 9C) at the spring elements 506*a* level. The adjustment switch 506 has been sectioned in FIG. 9C to remove the insulation disc 506*g* for more clearly showing the spring elements 506*a* from below. The cover includes a hole 504*e* through which the shoulder 506*j* of the adjustment switch 506 protrudes such that the top surface of the shoulder 506*j* is generally planar with a top surface of the cover 504 (as shown in FIG. 9A). The hole 504*e* of the cover 504 includes a bearing surface 504*a*, two stop limits 504*b*, a plurality of position detents 504*c*, a plurality of detent walls 504*d*, a plurality of crests 504*f*, and a plurality of troughs 504*g*.

The bearing surface 504*a* defines in part the circular hole 504*e*, which locates the adjustment switch 506 and allows rotational movement of the adjustment switch 506. The shoulder 506*j* has a diameter dimensioned such that a top portion of the shoulder 506*j* can protrude through the hole 504*e*.

The stop limits 504*b* are located below the bearing surface 504*a*. Specifically, each stop limit 504*b* is a surface formed by removing material along the depth of the hole 504*e* such that a partial greater-diameter hole is formed within the hole 504*e*.

The position detents 504*c* are located below the stop limits 504*b*, along the circumference and near the bottom of the hole 504*e* (in the interior of the cover 504). Each detent 504*c* is defined by two detent walls 504*d* coupled by a trough 504*g*. In addition, each detent 504*c* is connected to another detent 504*c* by a common crest 504*f*. Specifically, the crest 504*f* is located at the intersection of two detent walls 504*d* that are not part of the same detent 504*c* and that is a point generally closest to a center axis of the hole 504*e*.

When the adjustment switch 506 is inserted into the hole 504*e*, the flex members 506*c* are generally aligned with the position detents 504*c* along an axial direction of the hole 504*e*. Additionally, a center axis of the adjustment switch 506 is is generally collinear with the center axis of the hole 504*e*. Each of the location nipples 506*d* is located within a corresponding clearance formed by two detent walls 504*d* between two consecutive crests 504*f*.

When the adjustment switch 506 is rotated relative to the cover 504, the location nipples 506*d* comes into contact with the detent walls 504*d*. The flex member 506*c* of the spring elements 506*a* elastically deforms towards the center axis of the adjustment switch 506 to allow the location nipple 506*d* to move over a crest 504*f* of a position detent 504*c*. When the movement forces the location nipple 506*d* of each spring element 506*a* past a respective crest 504*f*, the location nipple 506*d* is forced by the flex member 506*c* into a centered position between two detent walls 504*d* that are not joined by a crest 504*f*. In the centered position the location nipple 506*d* is generally aligned with the trough 504*g* of a respective detent 504*c*.

The crests 504*f* are designed such that they reduce the likelihood that a location nipple 506*d* of the adjustment switch 506 will statically stop on top of any crest 504. For example, the angles and radius sizes of the crests are selected to provide crests that are as small as possible for achieving the current invention. In another example, the detent walls 504*d* should have an angle that allows easy centering of the location nipples 506*d*. Accordingly, the design of the position detents 504*c* should reduce, or eliminate, the amount of play that the adjustment switch 506 can move relative to the hole 504*e*. The feel and accuracy of the position detents 504*c* movements should take into considerations other factors, such as possible tolerance stack-ups of the potentiometer 510 relative to the printed wire assembly 508, the "X" style protrusion 506*h* relative to the "X" style pocket 511, etc.

Figure 10:
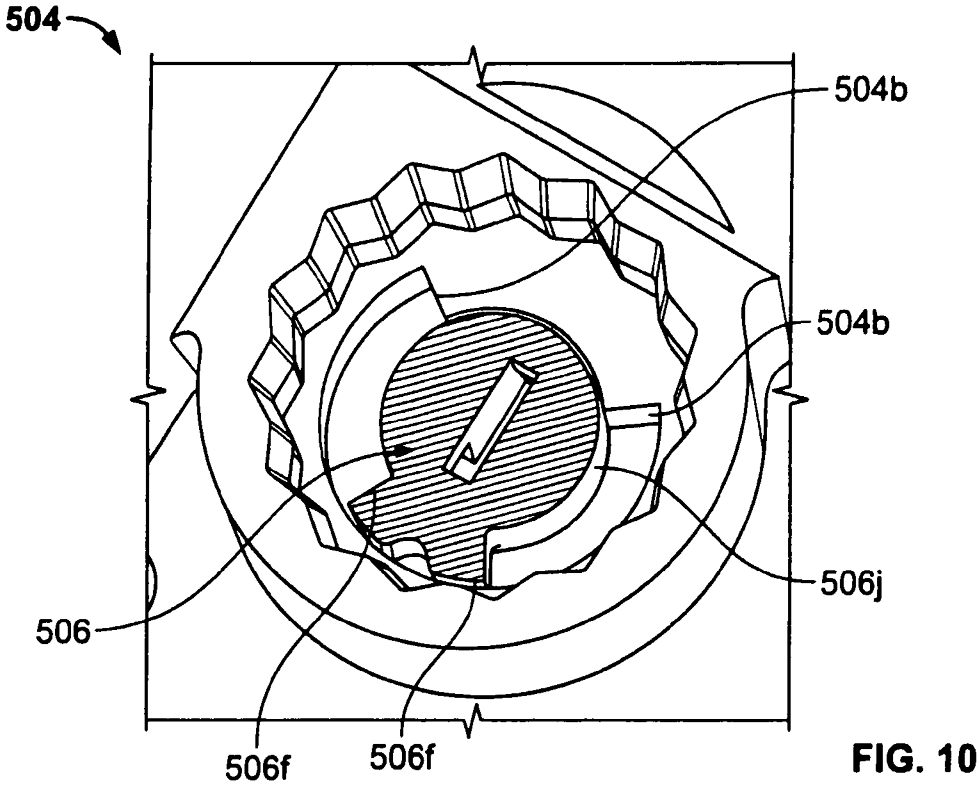
FIG. 10 illustrates another cross-sectioned portion of the adjustment switch of FIG. 6 inserted into the hole of FIG. 9B.

FIG. 10 illustrates the interaction between the adjustment switch 506 and the cover 504 (viewing from inside the cover) at the stop 506*e* level, wherein the adjustment switch 506 has been sectioned to remove features located below the stop 506*e* (e.g., insulation disc 506*g*, spring elements 506*a*, etc.). The adjustment switch 506 can rotate in either direction (clockwise or counterclockwise) until opposing stops of the two parts make contact. Specifically, the adjustment switch 506 can rotate until either one of its stopping surfaces 506*f* makes contact with a respective stop limit 504*b* of the cover 504. The contact between the stopping surfaces 506*f* and the stop limits 504*b* ensures that the adjustment switch 506 will not be rotated beyond a design rotation specification. The potentiometer 510 can also have internal stops, which also prevent over-rotation.

Figure 11A:
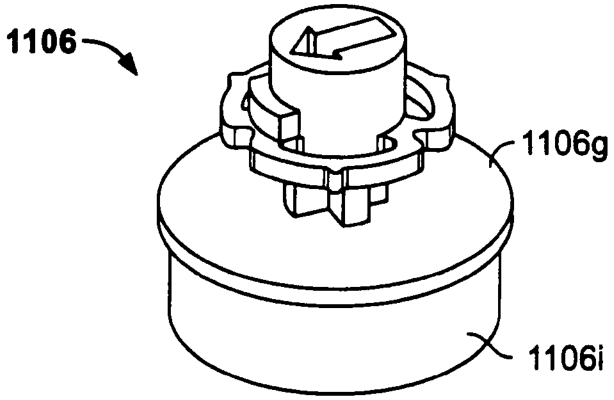
FIG. 11A illustrates a top perspective view of an adjustment switch having a insulative skirt according to yet another alternative implementation of the present application.
Figure 11B:
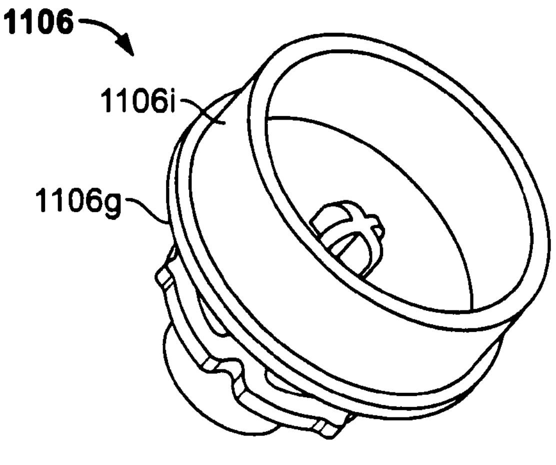
FIG. 11B illustrates a bottom perspective view of the adjustment switch of FIG. 11A.

FIGS. 11A and 11B illustrate an adjustment switch 1106 according to an alternative aspect of the present invention. The adjustment switch 1106 includes an insulation disc 1106*g* having a skirt 1106*i* around its bottom surface to further increase ESD protection and/or to reduce any pollution from entering a corresponding potentiometer. The skirt 1106*i* is designed to totally encircle the potentiometer.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for translating mechanical positions to trip curves of an electrical tripping system, the method comprising:

operatively coupling a mechanical button to a potentiometer of an electrical tripping system, the electrical tripping system being operable to trip at an operating trip curve;

in response to adjusting the mechanical button to a first position, receiving from the potentiometer a first signal indicative of a trip curve of a plurality of trip curves;

associating, via a controller, the first signal with one of the plurality of trip curves to produce a first trip curve; and setting the operating trip curve to be the first trip curve.

2. The method of claim 1, further comprising:

in response to adjusting the mechanical button to a second position, receiving from the potentiometer a second signal indicative of a trip curve of the plurality of trip curves;

associating the second signal with another one of the plurality of trip curves to produce a second trip curve; and setting the operating trip curve to be the second trip curve.

3. The method of claim 2, further comprising:

converting the first signal into a corresponding first digital value;

comparing the first digital value against a plurality of switch thresholds;

responsive to the comparing, determining in which one of said plurality of switch thresholds said first digital value falls; and associating each of at least some of the plurality of switch thresholds with a distinct mechanical orientation position of the mechanical button.

4. The method of claim 1, further comprising storing the plurality of trip curves in an EEPROM, wherein the plurality of trip curves include at least two current values that, if exceeded by a primary current associated with a current transformer of the electrical tripping system, cause the electrical tripping system to trip.

5. The method of claim 1, further comprising configuring an electronic circuit of the potentiometer to output a voltage that is converted by an analog-to-digital converter to a corresponding digital value.

6. The method of claim 1, further comprising rotating a dial to adjust the mechanical switch.

7. The method of claim 1, further comprising selecting the first position from an automatic protection mode position or a manual protection mode position.

8. The method of claim 1, further comprising:

storing the plurality of trip curves in a data table; and updating the data table to replace at least one of the plurality of trip curves with a new trip curve.

9. The method of claim 1, further comprising:

providing a trip curve range for the first trip curve, the trip curve range being defined by a maximum tripping threshold and a minimum tripping threshold; and calibrating the first position of the mechanical switch such that the first signal is associated with any trip curve within the trip curve range.

10. The method of claim 9, further comprising:

in response to adjusting the mechanical switch beyond a stop feature maximum limit, detecting an error; and resetting the operating trip curve to be a predetermined trip curve of the plurality of trip curves.

11. A method for adjusting a circuit breaker operating trip curve in response to selecting a mechanical position, the method comprising:

providing a mechanical button for selecting any of a plurality of mechanical positions;

mounting a potentiometer to a printed wire assembly of a circuit breaker, the potentiometer having a plurality of potentiometer positions indicative of respective ones of a plurality of trip curves;

operatively coupling each of the plurality of mechanical positions to a corresponding one of the plurality of potentiometer positions;

in response to selecting a first position of the plurality of mechanical positions, providing a potentiometer first signal indicative of a first trip curve of the plurality of trip curves to an analog-to-digital converter;

setting an operative trip curve of the circuit breaker to be the first trip curve;

in response to selecting a second position of the plurality of mechanical positions, providing a potentiometer second signal indicative of a second trip curve of the plurality of trip curves to the analog-to-digital converter; and changing the operative trip curve of the circuit breaker to be the second trip curve.

12. The method of claim 11, further comprising selecting the first position from an automatic protection mode and the second position from a manual protection mode.

13. The method of claim 11, further comprising associating the first signal with the first trip curve based on a data table of trip curves.

14. The method of claim 13, further comprising storing the data table in a processor of the circuit breaker.

15. The method of claim 13, further comprising resetting the operating trip curve to be a predetermined trip curve of the plurality of trip curves in response to detecting a mechanical switch error or in response to a checksum of the data table not equaling a predetermined checksum associated with the data table and stored with the data table.

16. An electrical tripping system operable at an operating trip curve, comprising:

a mechanical button having a plurality of mechanical positions;

a potentiometer operatively coupled to the mechanical button, the potentiometer producing a first voltage signal in response to selection of a first position of the plurality of mechanical positions;

a controller communicatively coupled to the potentiometer and programmed to associate the first voltage signal with one of a plurality of trip curves to produce a first trip curve, and set the operating trip curve to be the first trip curve; and a trip unit coupled to the controller and operable to trip in response to a primary current exceeding the first trip curve.

17. The electrical tripping system of claim 16, wherein the mechanical switch is a rotating dial.

18. The electrical tripping system of claim 16, further comprising a memory for storing the plurality of trip curves.

19. The electrical tripping system of claim 18, wherein the memory is communicatively coupled to a user interface for receiving new values for the plurality of trip curves.

20. The electrical tripping system of claim 16, wherein each of the plurality of mechanical positions is associated with a voltage range, the voltage range including a maximum voltage threshold and a minimum voltage threshold.

* * * * *